(12) United States Patent
Huang et al.

(10) Patent No.: US 12,484,754 B2
(45) Date of Patent: Dec. 2, 2025

(54) AUTONOMOUS ROBOT

(71) Applicant: SHENZHEN SILVER STAR INTELLIGENT GROUP CO., LTD., Shenzhen (CN)

(72) Inventors: Yiting Huang, Shenzhen (CN); Lirong Ye, Shenzhen (CN)

(73) Assignee: SHENZHEN SILVER STAR INTELLIGENT GROUP CO., LTD., Shenzhen (CN)

( * ) Notice: Subject to any disclaimer, the term of this patent is extended or adjusted under 35 U.S.C. 154(b) by 203 days.

(21) Appl. No.: 18/217,083

(22) Filed: Jun. 30, 2023

(65) Prior Publication Data

US 2024/0000281 A1 Jan. 4, 2024

(30) Foreign Application Priority Data

Jun. 30, 2022 (CN) .......................... 202210759516.9

(51) Int. Cl.
*A47L 11/40* (2006.01)
(52) U.S. Cl.
CPC ....... *A47L 11/4061* (2013.01); *A47L 11/4011* (2013.01); *A47L 2201/04* (2013.01)
(58) Field of Classification Search
CPC .............. A47L 11/4061; A47L 11/4011; A47L 2201/04; A47L 11/38; A47L 11/4008;
(Continued)

(56) References Cited

U.S. PATENT DOCUMENTS 8,744,628 B2   6/2014  Tang
11,278,177 B2  3/2022  Lin et al.
(Continued)

FOREIGN PATENT DOCUMENTS

CN   102039595 A   5/2011
CN   103324193 A   9/2013
(Continued)

OTHER PUBLICATIONS

Chinese Office Action corresponding to CN Application No. 202210759516.9; Issue Date, May 30, 2024, 3 pages.
(Continued)

*Primary Examiner* — Bao Long T Nguyen
(74) *Attorney, Agent, or Firm* — Zhigang Ma (57) ABSTRACT

An autonomous robot includes a robot body, a movement component, a collision sensor, an edge sensor, and a controller. The robot body includes a front collision body case, and a peripheral contour of the front collision body case is rectangular. The collision sensor is configured to generate a collision detection signal. The edge sensor is configured to transmit and receive the edge detection signal. The controller is configured to control the robot body to perform an edgewise adjustment mode. In the edgewise adjustment mode, the controller gradually adjusts a forward direction of the movement component towards the same target deflection direction according to the collision detection signal, in order to gradually reduce a relative distance between the edge sensor and an obstacle until the relative distance is within a preset edge detection distance range. Thus, a problem of low efficiency in edgewise movement is improved.

11 Claims, 5 Drawing Sheets

(58) Field of Classification Search
CPC ... A47L 2201/00; A47L 9/2805; G05D 1/242; G05D 1/628; G05D 2109/10; G05D 1/241; G05D 2105/10; G05D 2107/40; G05D 1/0227; G05D 1/0238; E04G 23/002

See application file for complete search history.

(56) References Cited

U.S. PATENT DOCUMENTS

| | | | |
|---|---|---|---|
| 12,130,627 | B2 | 10/2024 | Li |
| 2008/0276407 | A1* | 11/2008 | Schnittman ............ B60L 50/52 901/1 |
| 2012/0232696 | A1 | 9/2012 | Tang |
| 2019/0321979 | A1 | 10/2019 | Ahn |
| 2020/0069125 | A1* | 3/2020 | Gritsenko ............... A47L 9/009 |
| 2020/0178750 | A1 | 6/2020 | Lin et al. |
| 2020/0253445 | A1 | 8/2020 | So et al. |
| 2021/0321854 | A1 | 10/2021 | Zhang et al. |
| 2023/0152809 | A1 | 5/2023 | Li |

FOREIGN PATENT DOCUMENTS

| | | | |
|---|---|---|---|
| CN | 107544524 | A | 1/2018 |
| CN | 108958254 | A | 12/2018 |
| CN | 109464075 | A | 3/2019 |
| CN | 209678392 | U | 11/2019 |
| CN | 110989621 | A | 4/2020 |
| CN | 111557618 | A | 8/2020 |
| CN | 111857126 | A | 10/2020 |
| CN | 111906779 | A | 11/2020 |
| CN | 112075886 | A | 12/2020 |
| CN | 113876253 | A | 1/2022 |
| CN | 114052561 | A | 2/2022 |
| CN | 114617493 | A | 6/2022 |
| CN | 114983293 | A | 9/2022 |
| JP | 2009169802 | A | 7/2009 |
| WO | 2021238222 | A1 | 12/2021 |

OTHER PUBLICATIONS

Chinese Office Action corresponding to CN Application No. 202210759516.9; Issue Date, Sep. 27, 2023, 9 pages.
International Search Report for International Application No. PCT/CN2023/096951; Mailing Date, Sep. 22, 2023, 5 pages.

* cited by examiner

FIG. 8F

AUTONOMOUS ROBOT

CROSS-REFERENCE TO RELATED APPLICATION

This application claims priority to Chinese patent application No. 202210759516.9, filed on Jun. 30, 2022, the entire contents of which are incorporated herein by reference.

FIELD

The present application relates to the technical field of robotic technologies, and more particularly, to an autonomous robot.

BACKGROUND

When an existing robot encounters a wall, this robot can perform a cleaning operation along the wall. Usually, a robot is equipped with a wall detector, and the distance between the robot and the wall is detected through the wall detector. When the robot collides with the wall for the first time, the robot needs to adjust its posture to keep a preset distance between the wall detector and the wall. Then, the robot moves forward along the wall.

Currently, signal strength of an edge sensor of the robot is not linearly related to the distance from the edge sensor to an obstacle, and the distance between the robot and the obstacle cannot be calculated through the edge signal strength. Therefore, the prerequisite for using the edge sensor to move along the obstacle is that: infrared signal strength is determined first when the distance between the edge sensor and the obstacle is within an expected edge distance; then, the robot uses the signal strength as a reference value to move along the wall.

Peripheral contours of front collision body cases of some existing robots are circular. When the robot adjusts its posture at a location adjacent to the wall, the robot moves backwards at a small distance and rotates by 90° locally to ensure that the distance between the edge sensor and the obstacle is at the expected edge distance. However, when the peripheral contours of the front collision body cases of some robots are rectangular, in order to ensure that this robot does not collide with the wall during posture adjustment, the robot needs to move backwards at an enough distance to ensure that the peripheral contour of the robot does not collide with the wall during rotation. Thus, a backward movement distance of the robot is often too large to ensure that the distance between the edge sensor and the obstacle is at the expected edge distance, which does not meet the requirement of edgewise movement mode. An edgewise movement cannot be performed. It is hard to reliably and effectively achieve the purpose of maintaining a preset distance between the edge sensor and the wall. Thus, an efficiency of edgewise movement of the robot can be reduced, either.

DESCRIPTION OF THE DRAWINGS

One or a plurality of embodiment(s) is/are illustrated as examples according to the corresponding accompanying drawings, and these exemplified illustrations do not constitute as limitations to the embodiments. Elements having the same reference numeral in the drawings represent similar elements, unless otherwise these elements having the same reference numeral are specifically defined. The figures in the drawings do not constitute as limitation of proportion.

DETAILED DESCRIPTION OF EMBODIMENTS

In order to make the objective, the technical solutions, and the advantages of the present application be clearer and more understandable, the present application is further described in detail with reference to the accompanying figures and the embodiments. It should be understood that, the specific embodiments described herein are only intended to explain the present application rather than limiting the present application. Based on the embodiments in the present application, all other embodiments which are obtained by the one of ordinary skill in the art without paying creative efforts should all be included in the protection scope of the present application.

It should be noted that, the various features in the embodiments of the present application can be combined with each other without confliction, and any combination of these features is included within the scope of protection of the present application. In addition, although functional modules are divided in the schematic diagram of the device, and the logical order is shown in the flow diagrams, in some conditions, the steps shown or described can be performed through a dividing of the modules different from the dividing of the modules in the device or in an order different from the orders in the flow diagrams. Furthermore, expressions such as "first", "second" and "third" used in the present application are not intended to limit the order of data and the order of execution. Instead, these expressions are only used to differentiate identical or similar items which have essentially the same functions and effects.

An autonomous robot 100 is provided in one embodiment of the present application. Where the autonomous robot 100 may be a cleaning robot, a pet robot, a carrying robot, a nursing robot, etc., where the cleaning robot may be a sweeping robot, a vacuum robot, a mopping robot, a washing robot, etc.

Figure 1:
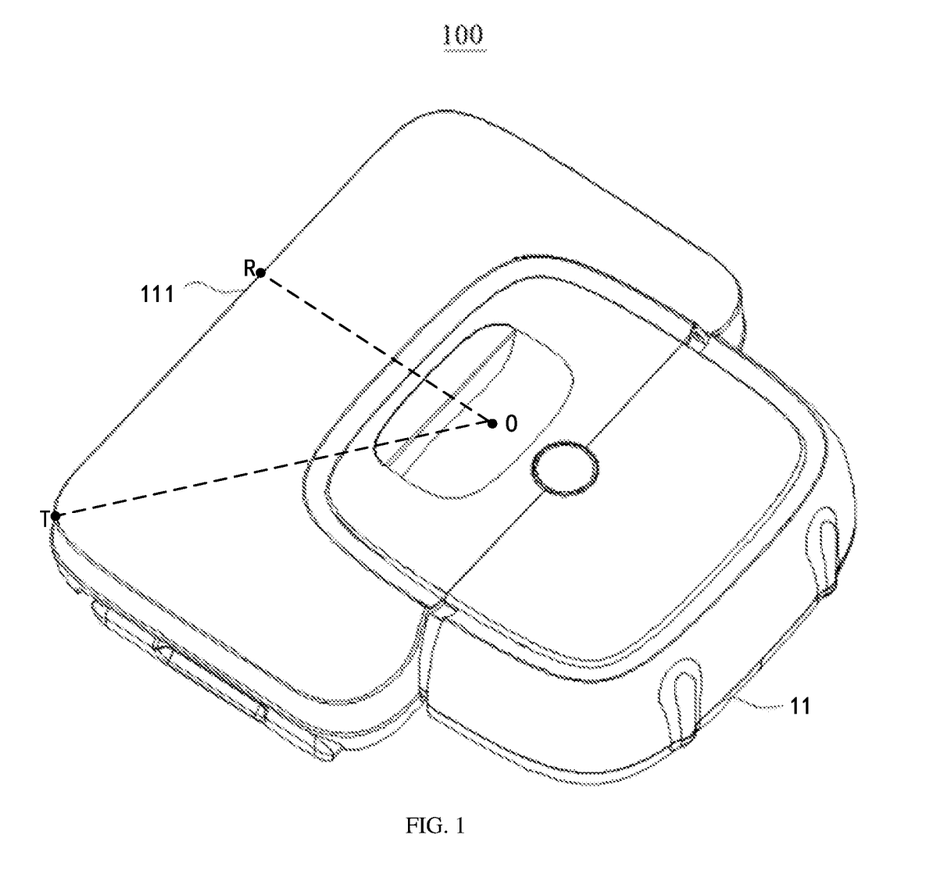
FIG. 1 illustrates a schematic structural diagram of an autonomous robot provided by one embodiment of the present application.
Figure 2:
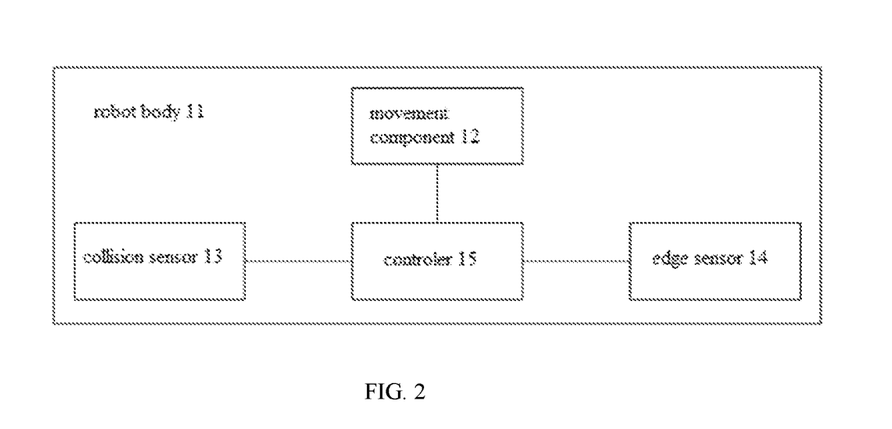
FIG. 2 illustrates a schematic circuit configuration of the autonomous robot provided by one embodiment of the present application.

Referring to FIGS. 1 and 2, the autonomous robot 100 includes a robot body 11, a movement component 12, a collision sensor 13, an edge sensor 14, and a controller 15.

The robot body 11 serves as a load-bearing body of the autonomous robot 100, is configured to provide an accommodation space to accommodate various components used for controlling the operation of the autonomous robot 100. The robot body 11 includes a front collision body case 111, and a peripheral contour of the front collision body case 111 is rectangular. Where, the front collision body case 111 is mounted in the front of the robot body 11 to buffer the collision between the autonomous robot 100 and an obstacle.

The movement component 12 is mounted on the robot body 11 and is configured to drive the robot body 11 to move on a surface to be cleaned. Where, the movement component 12 may use any suitable actuating mechanism to drive the robot body 11 to move.

In some embodiments, the movement component 12 includes a left wheel drive unit and a right wheel drive unit. The left wheel drive unit and the right wheel drive unit drive the robot body 11 to move by cooperating with each other. Where, each of the left wheel drive unit and the right wheel drive unit includes a motor, a wheel drive mechanism, and a ground wheel. A shaft of the motor is connected to the wheel drive mechanism, the ground wheel is connected to the wheel drive mechanism, and the motor is electrically connected to the controller 15. The wheel drive mechanism drives the ground wheel to rotate according to the control command sent by the controller 15, thereby driving the robot body 11 to move forward, move backward, or turn around.

The collision sensor 13 is mounted on the robot body 11 and is adjacent to the front collision body case 111. If the front collision body case 111 collides with the obstacle, the obstacle will compress the collision sensor 13. Therefore, when the front collision body case 111 collides with the obstacle, the collision sensor 13 generates a collision detection signal, this collision detection signal is used to indicate that the front collision body case 111 collides with the obstacle.

In some embodiments, there are two groups of collision sensors 13, and the two groups of collision sensors 13 are symmetrically distributed on both sides of the central axis of the front collision body case 111, and each group of collision sensors 13 is arranged to be adjacent to the front collision body case 111. When a left side of the front collision body case 111 collides with the obstacle, and the group of collision sensors on the left side will generate the collision detection signal. When the right side of the front collision body case 111 collides with the obstacle, the group of collision sensors on the right side will generate the collision detection signal. When the middle part of the front collision body case 111 collides with the obstacle, both of the two groups of collision sensors can generate collision detection signals. Thus, obstacles located in different directions can be detected, and a corresponding control strategy can be selected accordingly later.

In some embodiments, there are three groups of collision sensors 13. Where, two groups of collision sensors 13 are symmetrically distributed on both sides of the central axis of the front collision body case 111. When the left side of the front collision body case 111 collides with the obstacle, the group of collision sensors on the left generates the collision detection signal. When the right side of the front collision body case 111 collides with the obstacle, the group of collision sensors on the right generates the collision detection signal. Where, one group of collision sensors 13 is adjacent to the middle part of the front collision body case 111. When the middle part of the front collision body case 111 collides with the obstacle, said group of collision sensors 13 will generate the collision detection signal. Due to this arrangement of the collision sensors 13, obstacles located in different directions can be detected, and a corresponding control strategy can be selected accordingly later.

The edge sensor 14 is mounted on the left side or the right side of the robot body 11 and is configured to transmit and receive edge detection signals on the left side or the right side of the robot body 11.

In some embodiments, when the edge sensor 14 is mounted on the left side of the robot body 11, the edge sensor 14 transmits an edge detection signal towards the left side of the robot body 11. The edge detection signal is reflected by the obstacle on the left and then is incident on the edge sensor 14. Thus, the edge sensor 14 receives the edge detection signal reflected back by the obstacle on the left. When the edge sensor 14 is mounted on the right side of the robot body 11, the edge sensor 14 transmits an edge detection signal towards the right side of the robot body 11. The edge detection signal is reflected by the obstacle on the right side and then is incident on the edge sensor 14. Thus, the edge sensor 14 receives the edge detection signal reflected back by the obstacle on the right side.

Where, the number of edge sensors 14 may be two, one edge sensor 14 is mounted on the left side of the robot body 11 and the other edge sensor 14 is mounted on the right side of the robot body 11. Alternatively, the number of the edge sensor 14 may be one, one edge sensor 14 is mounted on the left side or the right side of the robot body 11.

In some embodiments, the edge sensor 14 may be a sensor that uses any suitable ranging principle or ranging form. For example, the edge sensor 14 includes infrared transceiver or ultrasonic sensor.

In some embodiments, the left side or the right side of the robot body 11 is provided with a transparent hole, and the transparent hole is provided with a lens. The edge sensor 14 is mounted on the robot body 11, and the edge detection signal can be transmitted through the lens.

The controller 15 is mounted on the robot body 11 and is electrically connected to the collision sensor 13 and the edge sensor 14, and can be used to control the robot body 11 to perform the edgewise adjustment mode. The edgewise adjustment mode is the mode in which the autonomous robot 100 is adjusted to enter the edgewise movement mode, and the edgewise movement mode is the mode in which the autonomous robot 100 moves along an edge of the obstacle. Usually, before moving along the edge of the obstacle, the autonomous robot 100 needs to perform the edgewise adjustment mode in order to perform the edgewise movement mode effectively subsequently.

In some embodiments, the controller 15 performs the edgewise adjustment mode upon receiving an edgewise movement command, and then performs the edgewise movement mode after the edgewise adjustment mode is terminated.

In the edgewise adjustment mode, the controller 15 gradually adjusts the forward direction of the movement component 12 towards the same target according to the collision detection signal fed back by collision sensor 13, in order to gradually reduce the relative distance between the edge sensor 14 and the obstacle until the relative distance is within the preset edge detection distance range.

The target deflection direction is the deflection direction used to indicate the autonomous robot 100 to gradually reduce the relative distance between the edge sensor 14 and the obstacle.

In some embodiments, the controller 15 determines the edgewise movement direction of the autonomous robot 100 first, and then selects the target deflection direction according to the edgewise movement direction of the autonomous robot 100. The edgewise movement direction is the direction in which the autonomous robot 100 moves along the edge of the obstacle.

In some embodiments, if the controller 15 determines that the edgewise movement direction of the autonomous robot 100 is the left edgewise movement direction, the right rotation direction is selected as the target deflection direction. Where, the left edgewise movement direction is the direction in which the obstacle is located on the left side of the autonomous robot 100 when the autonomous robot moves along the edge of the obstacle. The right rotation direction is the direction in which the autonomous robot 100 rotates relative to the obstacle and towards the right side thereof.

Figure 3:
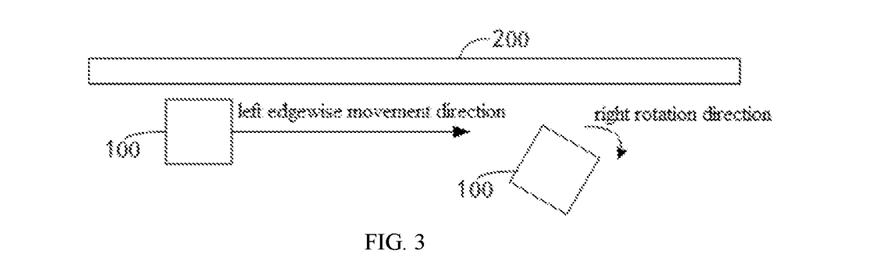
FIG. 3 illustrates a schematic diagram of performing, by the autonomous robot, an edgewise movement in a left edgewise movement direction along the obstacle provided by one embodiment of the present application.

Referring to FIG. 3, when the autonomous robot 100 encounters an obstacle 200, the autonomous robot 100 can move along the edge of the obstacle 200. When the edgewise movement direction of autonomous robot 100 is the left edgewise movement direction, the obstacle 200 is on the left side of the edgewise movement direction of the autonomous robot 100, as compared to the autonomous robot 100. The controller 15 adjusts the forward direction of the movement component 12 as the right rotation direction to gradually reduce the relative distance between the edge sensor 14 and the obstacle, according to the collision detection signal.

If the controller 15 determines that the edgewise movement direction of the autonomous robot 100 is the right edgewise movement direction, then, the left rotation direction is selected as the target deflection direction. Where, the right edgewise movement direction is the direction in which the obstacle is located at the right side of the autonomous robot 100 when the autonomous robot 100 moves along the edge of the obstacle. The left rotation direction is the direction in which the autonomous robot 100 rotates towards the left side thereof relative to the obstacle.

Figure 4:
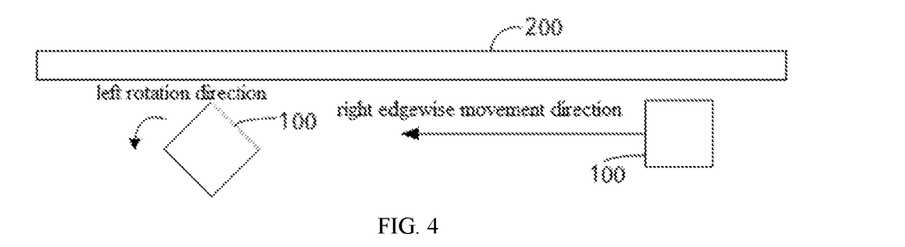
FIG. 4 illustrates a schematic diagram of performing, by the autonomous robot, an edgewise movement in a right side edgewise movement direction along the obstacle provided by one embodiment of the present application.

Referring to FIG. 4, when the autonomous robot 100 encounters the obstacle 200, the autonomous robot 100 may move along the edge of the obstacle 200. When the edgewise movement direction of autonomous robot 100 is the right edgewise movement direction, the obstacle 200 is located at the right side of the edgewise movement direction of the autonomous robot 100 as compared to the autonomous robot 100. The controller 15 adjusts the forward direction of the movement component 12 according to the collision detection signal as the left rotation direction to gradually reduce the relative distance between the edge sensor 14 and the obstacle.

The controller 15 gradually controls the movement component 12 to adjust its forward direction towards the same target deflection direction upon receiving the collision detection signal feedback from the collision sensor 13. When the forward direction of movement component 12 is adjusted, the movement component 12 will drive the robot body 11 to rotate at the same time. When the robot body 11 rotates, the robot body 11 will also drive the front collision body case 111, the collision sensor 13, and the edge sensor 14 to rotate to gradually reduce the relative distance between edge sensor 14 and the obstacle until the relative distance is within the preset edge detection distance range.

The preset edge detection distance range is a maintained distance range between the autonomous robot 100 and the obstacle when the autonomous robot 100 performs the edgewise movement mode. In some embodiments, the preset edge detection distance range is between 1 cm and 5 cm. For example, the preset edge detection distance range is between 1 cm and 2 cm, or between 1 cm and 3 cm, or between 2 cm and 4 cm, or 2 cm, or 3 cm, etc.

In this embodiment, when the peripheral contour of the front collision body case 111 of the autonomous robot 100 is rectangular, and when the autonomous robot 100 encounters an obstacle, the autonomous robot 100 may gradually and finely adjust the relative distance between the edge sensor 14 and the obstacle towards the same target deflection direction, thereby reliably and effectively adjusting the relative distance between the edge sensor 14 and the obstacle to be within the preset edge detection distance range, and avoiding a problem of over adjustment caused due to excessive posture adjustment of the autonomous robot 100. Thus, a low efficiency of edgewise movement is improved, and improvement of the efficiency of entering the autonomous robot 100 into the edgewise movement mode is facilitated.

In some embodiments, the obstacle is a wall. When the autonomous robot 100 first collides with the obstacle during the forward movement process, the autonomous robot 100 begins to perform the edgewise adjustment mode to adjust the relative distance between the edge sensor 14 and the obstacle to be within the preset edge detection distance range.

In some embodiments, the obstacle is a designated obstacle that meets the specified requirement. This obstacle includes the obstacle having the longest segment length in searched obstacles. The autonomous robot 100 collects environmental sense data, fits and generates segments of the various obstacles based on the sensing data, and then searches an obstacle having the longest segment length from the segments of the various obstacles and takes this obstacle as the designated obstacle. Generally, in an indoor environment, walls are used as obstacles, and line segments of walls are the longest. Thus, walls are usually selected as the designated obstacles.

The controller 15 is navigated to the designated obstacle according to the position of the obstacle and the current position of the autonomous robot. In some embodiments, the controller 15 selects a position of the designated obstacle closest to the current position as the target position, generates a navigation path according to the target position and the current position, and moves to the target position of the designated obstacle according to the navigation path.

When the autonomous robot 100 moves to the target position of the designated obstacle, the autonomous robot 100 may collide with a first wall of the obstacle. At this time, the autonomous robot 100 regards this collision as the initial collision. Then, the autonomous robot 100 begins to perform the edgewise adjustment mode.

Usually, when the autonomous robot 100 is a cleaning robot, the autonomous robot 100 needs to clean the indoor area, the autonomous robot 100 first performs cleaning operation along edges of the wall, and then performs cleaning operation in a central area of the room along a bow-shaped path. Before moving along the edges of the wall, the autonomous robot 100 needs to perform the edgewise adjustment mode in order to perform the edgewise movement mode effectively and subsequently. When the autonomous robot 100 collides with the wall, the autonomous robot 100 enters the edgewise adjustment mode.

In some embodiments, the execution of the edgewise adjustment mode includes the following steps:

At step A, the front collision body case 111 collides with the obstacle, the collision sensor 13 is triggered to generate a collision detection signal, and a step B is performed.

At step B, the controller 15 controls the movement component 12 to drive the robot body 11 to move backward responsive to receiving the collision detection signal. The controller 15 controls the movement component 12 to drive the robot body 11 to rotate by a preset angle towards the target deflection direction to finely adjust the relative distance, and a step C is performed.

At step C, the controller 15 controls the movement component 12 to drive the robot body 11 to move forward again in the adjusted posture. The controller 15 detects whether the collision sensor 13 generates another collision detection signal during the forward movement of the robot body 11. If said another collision detection signal is detected by the controller 15, the step B is performed. If said another collision detection signal is not detected by the controller 15, step C is skipped.

In the step A, when the front collision body case 111 collides with the obstacle, the front collision body case 111 compresses the obstacle. At the same time, the front collision body case 111 compresses the collision sensor 13, the collision sensor 13 is triggered to generate a collision detection signal. In the step A, during the forward movement process of the robot body 11, the front collision body case 111 collides with the obstacle, that is, a front side of the front collision body case 111 collides with the obstacle, the collision sensor 13 is triggered to generate the collision detection signal.

In the step B, the controller 15 is triggered by the collision detection signal and transmits a backward movement command to the movement component 12. The movement component 12 drives the robot body 11 to move backward according to the backward movement command. When the robot body 11 moves backwards, the robot body 11 will drive the edge sensor 14 to move backwards simultaneously.

After the backward movement is completed, the controller 15 sends a deflection command to the movement component 12, the movement component 12 drives the robot body 11 to rotate by a preset angle towards the target deflection direction according to the deflection command to finely adjust the relative distance.

In some embodiments, the preset angle is less than or equal to 20°, that is, the value range of the preset angle is between (0°, 20°]. This value range of the preset angle can be compatible with most autonomous robots 100 on the market that do not collide with an obstacle during each deflection of the autonomous robot 100.

In some embodiments, the preset angle is (0°, 10°], or [1°, 10°], or [2°, 10°], or [2°, 20°]. As an alternative, the preset angle is 3° or 4° or 5° or 6° or 7° or 8°.

In the step C, the robot body 11 rotates at the preset angle towards the target deflection direction to form the adjusted posture of the robot body 11. The controller sends a forward movement command to the movement component 12 under the condition of the adjusted posture of the robot body 11, and the controller 15 controls the movement component 12 to drive the robot body 11 to move forward again according to the forward movement command That is, the autonomous robot 100 moves along the edge of the obstacle. The controller 15 accesses the collision sensor 13 at a preset frequency during the forward movement process of the robot body 11 so as to detect whether the collision sensor 13 generates a collision detection signal. If the collision detection signal is generated, the step B is performed. Which means that the autonomous robot 100 repeatedly performs the fine adjustment in the step B until the relative distance is within the preset edge detection distance range. Thus, the autonomous robot 100 can reliably and effectively adjust the relative distance between the edge sensor 14 and the obstacle to be within the preset edge detection distance range, the problem of over adjustment caused due to excessive posture adjustment of the autonomous robot 100 is avoided, and an occurrence of a missed area to be cleaned is avoided.

In some embodiments, the edgewise adjustment mode further includes a step D. In the step D, the robot body 11 continues to move forward, the controller 15 determines whether the edge detection signal is continuously and stably maintained within the preset strength threshold range. If the edge detection signal is continuously and stably maintained within the preset strength threshold range, the edgewise adjustment mode is terminated. If the edge detection signal is not continuously and stably maintained within the preset strength threshold range, the controller 15 adjusts the forward direction of the movement component according to an opposite direction of the target deflection direction until the edge detection signal is continuously and stably maintained within the preset strength threshold range. The edge detection signal herein refers to the edge detection signal reflected back by the obstacle.

The preset signal intensity threshold range refers to the intensity range of the edge detection signal reflected back by the obstacle when the relative distance is within the preset edge detection distance range. In some embodiments, the preset signal strength threshold range is configured as the strength range of the edge detection signal when the relative distance is any value within the range of 1 cm and 5 cm. For example, the preset strength threshold range is the strength of the edge detection signal when the relative distance is 2 cm.

If the strength of the edge detection signal falls within the preset signal strength threshold range, it indicates that the relative distance between the edge sensor 14 and the obstacle is within the preset edge detection distance range. If the strength of the edge detection signal does not fall within the preset signal strength threshold range, it indicates that the relative distance between the edge sensor 14 and the obstacle is not within the preset edge detection distance range.

In the edgewise adjustment mode, the strength of the edge detection signal occasionally falls within the preset strength threshold range. However, a condition that the autonomous robot 100 would not frequently collide with the obstacle when the autonomous robot 100 enters the edgewise movement mode and moves along the edge of the obstacle are not effectively guaranteed. According to this embodiment, the strength of the edge detection signal needs to be continuously and stably maintained within the preset signal strength threshold range in a predetermined distance and/or in a preset time duration, which indicates that the relative distance between the edge sensor 14 and the obstacle is continuously and stably maintained within the preset edge detection distance range. Thus, a condition that the autonomous robot 100 does not frequently collide with the obstacle when the autonomous robot 100 enters the edgewise movement mode and moves along the edge of the obstacle can be effectively guaranteed. Then, the controller 15 can terminate the edgewise adjustment mode and enter the edgewise movement mode.

The preset distance is a customized forward movement distance. The forward movement distance is the distance that the robot body 11 moves along the edge of the obstacle after the robot body 11 rotates by the preset angle towards the target deflection direction. For example, the preset distance is 5 centimeters, 15 centimeters, or 20 centimeters.

The preset duration is customized time duration of forward movement. The time duration of forward movement refers to the time duration during which the robot body 11 moves along the edge of the obstacle at a preset distance after rotating by the preset angle towards the target deflection direction. For example, the preset time duration is 3 seconds, 5 seconds, or 10 seconds.

If the edge detection signal is not continuously and stably maintained within the preset signal strength threshold range, the controller 15 adjusts the forward direction of the movement component according to the direction opposite to the target deflection direction until the edge detection signal is continuously and stably maintained within the preset signal strength threshold range. In this way, the relative distance between the edge sensor 14 and the obstacle can be adjusted to be within the preset edge detection distance range effectively and reliably.

In some embodiments, when the edgewise movement direction of the autonomous robot 100 is the left edgewise movement direction and the target deflection direction is the right rotation direction, if the edge detection signal is not continuously and stably maintained within the preset signal strength threshold range, the controller 15 adjusts the forward direction of the movement component according to the left rotation direction until the edge detection signal is continuously and stably maintained within the preset signal strength threshold range.

In some embodiments, when the edgewise movement direction of the autonomous robot 100 is the right edgewise movement direction and the target deflection direction is the left rotation direction, if the edge detection signal is not continuously and stably maintained within the preset signal strength threshold range, the controller 15 adjusts the forward direction of the movement component according to the right rotation direction until the edge sensor 14 is continuously and stably maintained within the preset signal strength threshold range.

In order to illustrate the working principle of the autonomous robot provided in this embodiment, the present application is described in detail below with reference to the FIGS. 5A-5D and FIGS. 6A-6G. In particular, FIGS. 5A-5D are schematic scenario diagrams of performing edgewise adjustment mode by the autonomous robot 100 provided by the conventional technology. As shown in FIGS. 5A-5D, for the convenience of illustration, the shape of the autonomous robot 100 of which the front collision body case 111 has a rectangular peripheral contour is equalized as a rectangle in the present application.

Generally, the edge sensor 14 is located on the right side of the autonomous robot 100. When the autonomous robot 100 enters the edgewise movement mode, the relative distance between edge sensor 14 and obstacle 200 is 2 centimeters. A side length of the autonomous robot 100 is 30 centimeters, and a distance from a deflection center to a vertex is 21.2 centimeters.

Figure 5A:
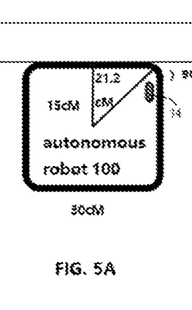
FIGS. 5A-5D illustrate schematic scenario diagrams of performing edgewise adjustment mode by the autonomous robot provided by the conventional technology.

As shown in FIG. 5A, the front collision body case 111 of the autonomous robot 100 collides with an obstacle 200. At this time, a right side length of the autonomous robot 100 forms an included angle of 90° with the obstacle 200. The collision sensor 13 sends a collision detection signal to the controller 15.

Figure 5B:
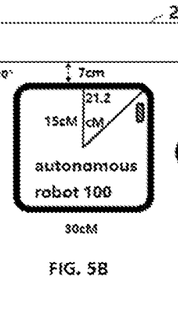

As shown in FIG. 5B, in order to ensure that the peripheral contour of the autonomous robot 100 does not touch the obstacles 200 during rotation process, the controller 15 controls the movement component to drive the robot body 11 to move backwards at 7 centimeters in response to receiving the collision detection signal.

Figure 5C:
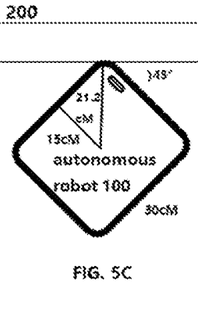

As shown in FIG. 5C, after the backward movement is completed, the controller 15 controls the movement component 12 to drive the robot body 11 to rotate by 45° in the left direction.

Figure 5D:
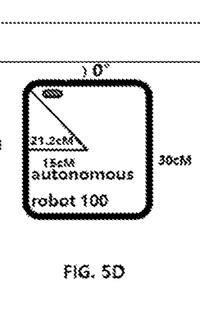

As shown in FIG. 5D, after the rotation, since the relative distance between the edge sensor 14 and the obstacle 200 is 7 centimeters, this relative distance does not meet the requirement of the edgewise movement mode, the autonomous robot 100 needs to adjust its posture frequently. Currently, the signal strength of the edge sensor 14 of the autonomous robot 100 is not linearly related to the distance from the edge sensor 14 to the obstacle, thus, the distance between the autonomous robot and the obstacle cannot be calculated according to the edge signal strength. Thus, the prerequisite for make the autonomous robot 100 to move along the obstacle by using the edge sensor 14 is that: the infrared signal strength is determined first when the distance between the edge sensor 14 and the obstacle is at an expected edge distance; then, the autonomous robot 100 uses this infrared signal strength as a reference value to move along the wall. Due to the inability to obtain the expected distance along the edge after rotation, the requirement of the edgewise movement mode cannot be met, and the edgewise movement mode cannot be performed.

Referring to FIGS. 6A-6G, FIGS. 6A-6G are schematic scenario diagrams of performing the edgewise adjustment mode by the autonomous robot 100 provided in one embodiment of the present application.

Figure 6A:
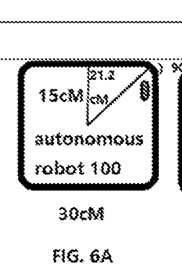
FIGS. 6A-6G illustrate schematic scenario diagrams of performing the edgewise adjustment mode by the autonomous robot provided by one embodiment of the present application.

As shown in FIG. 6A, the front collision body case 111 of the autonomous robot 100 collides with an obstacle 200. At this time, the right side length of the autonomous robot 100 forms an included angle of 90° with the obstacle 200. The collision sensor 13 sends a collision detection signal to the controller 15.

Figure 6B:
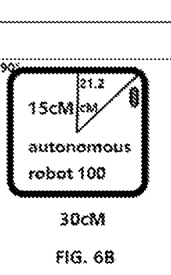

As shown in FIG. 6B, the controller 15 controls the movement component 12 to drive the robot body 11 to move backward by 2 centimeters in response to receiving the collision detection signal.

Figure 6C:
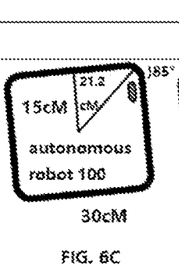

As shown in FIG. 6C, after the backward movement is completed, since the edgewise movement direction of the autonomous robot 100 is the right edgewise movement direction, the controller 15 selects the left rotation direction as the target deflection direction. The controller 15 controls the movement component 12 to drive the robot body 11 to rotate by 5° in the left rotation direction. At this time, the included angle formed between the right side length of the autonomous robot 100 and the obstacle 200 is 85°.

Figure 6D:
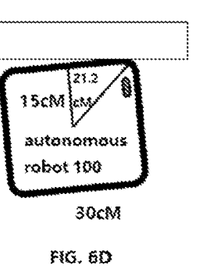

As shown in FIG. 6D, the controller 15 controls the movement component 12 to drive the robot body 11 to move forward again by 15 centimeters in the adjusted posture. During the process of moving forward by 15 centimeters, the front collision body case 111 collides with the obstacle 200 again. At this point, the controller 15 needs to control the movement component 12 to drive the robot body 11 to move backwards by 2 centimeters again, and control the movement component 12 to drive the robot body 11 to rotate by 5° in the left direction, and control the movement component 12 to drive the robot body 11 to move forward by 15 centimeters in the adjusted position, and detect whether a collision detection signal is received during the process of moving forward by 15 centimeters, and so on.

Figure 6E:
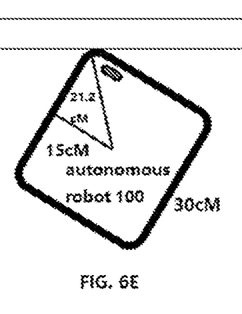
Figure 6F:
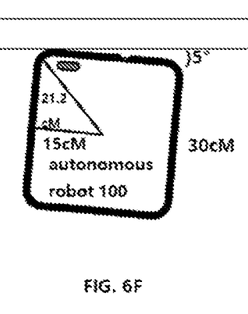

As shown in FIGS. 6E and 6F, the controller 15 controls the robot body 11 to adjust its posture for multiple times. During the process of moving forwards by 15 centimeters, the front collision body case 111 collides with the obstacle 200 again.

Figure 6G:
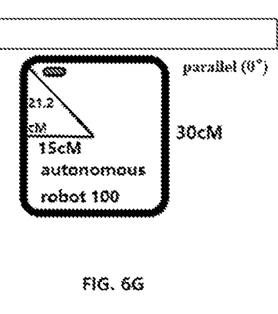

As shown in FIG. 6G, the controller 15 controls the robot body 11 to move backwards by 2 centimeters based on the posture of the robot body 11 shown in FIG. 6F, the state of moving backward is not shown in FIG. 6G. Then, the robot body 11 rotates by 5° towards the left direction. At this time, the right side length of autonomous robot 100 has an included angle of 0° with the obstacle 200, and the relative distance between the edge sensor 14 and the obstacle 200 is 2 centimeters. At this time, the posture of the robot body 11 meets the requirement for entering the edgewise movement mode. However, the autonomous robot 100 is unaware of the fact that the requirements for the edgewise movement mode is met. Thus, the controller 15 also needs to control the movement component 12 to drive the robot body 11 to move forward again by 15 centimeters in the adjusted posture. Due to the fact that the collision detection signal is not received during the process of moving forwards by 15 centimeters, and the edge detection signal is continuously and stably maintained within the preset signal strength threshold range, thus, the controller 15 believes that the relative distance between the edge sensor 14 and the obstacle 200 meets the requirements of the edgewise movement mode, and therefore terminate the edgewise adjustment mode and enter the edgewise movement mode.

As compared to the conventional technology, this embodiment is compatible with the edgewise adjustment mode of an autonomous robot 100 which has a front collision body case 111 with a rectangular peripheral contour, and facilitates improving the efficiency of entering the autonomous robot 100 into the edgewise movement mode.

In some embodiments, in the step B, the backward movement distance of the robot body 11 is less than or equal to the difference between the first distance and the second distance. Where the minimum distance from the deflection center of the robot body 11 to the front contour edge of the front collision body case 111 is determined as the first distance, and the maximum distance from the deflection center of the robot body 11 to the front contour edge of the front collision body case 111 is determined as the second distance.

Continue to refer to FIG. 1, OR represents the minimum distance from the deflection center of the robot body 11 to the front contour edge of front collision body case 111, OT represents the maximum distance from the deflection center of the robot body 11 to the front contour edge of front collision body case 111, and the difference value between the first distance and the second distance is formulized as ΔTR=OT−OR. Due to the constraint in this embodiment that the backward movement distance of the robot body 11 is less than or equal to the difference ΔTR, a problem of over-adjustment of the robot body 11 caused due to too large backward movement distance of the autonomous robot 100 can be effectively avoided, and improvement of the robustness of entering the autonomous robot 100 into the edgewise movement mode is facilitated.

In some embodiments, in the step B, the backward movement distance of the robot body 11 is less than or equal to half of the difference between the first distance and the second distance. That is, the backward movement distance of the robot body 11 is less than or equal to 0.5 ΔTR. Thus, a problem of over-adjustment caused due to the too large backward movement distance of the autonomous robot 100 can be more reliably and effectively avoided, and the robustness of entering the autonomous robot 100 into the edgewise movement mode is further improved.

In some embodiments, in the step B, the backward movement distance of the robot body 11 and the preset angle meet the following constraint conditions, which is formulize as:

$$0 < \theta < \alpha - \arccos\left(\frac{OE}{OF}\right);$$

$$OE = x + d;$$

$$d * \sin\theta \le L;$$

Where, x represents the backward movement distance of the robot body 11, θ represents the preset angle, d represents the minimum distance from the deflection center of the robot body 11 to the front contour edge of the front collision body case 111, OE represents the distance from the deflection center of the robot body 11 to the obstacle after the robot body 11 moves backwards, OF represents the maximum distance from the deflection center of the robot body 11 to the front contour edge of the front collision body case 111, α represents the preset contour parameter of the front collision body case 111, L represents the preset edge detection distance range.

Figure 7:
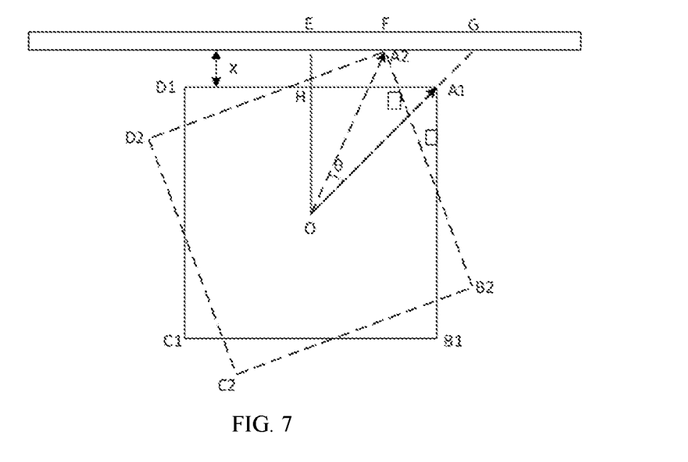
FIG. 7 illustrates a schematic equivalent diagram of an autonomous robot provided by one embodiment of the present application, wherein the peripheral contour of the front collision case body of the autonomous robot is rectangular.

Referring to FIG. 7, FIG. 7 illustrates an equivalent schematic diagram of an autonomous robot 100 provided in one embodiment of the present application, where a rectangular peripheral contour of the front collision body case 111 of the autonomous robot 100 is rectangular.

As shown in FIG. 7, an autonomous robot $A_1B_1C_1D_1$ is equivalent to a rectangle, where a line segment EH is the backward movement distance x, a line segment HO is the minimum distance d, and α is ∠$HOA_1$.

When the autonomous robot $A_1B_1C_1D_1$ move backwards by the distance x, during the rotation process, the maximum rotation angle of the autonomous robot $A_1B_1C_1D_1$ is ∠$A_2OG$ when the autonomous robot $A_1B_1C_1D_1$ does not collide with the obstacle 200. Thus, the preset angle that the autonomous robot $A_1B_1C_1D_1$ rotates towards the left deflection direction cannot exceed ∠$A_2OG$, which means that, a following constraint condition needs to be met, this constraint condition is formulized as:

$$0 < \theta < \alpha - \arccos\left(\frac{OE}{OF}\right); \text{ where, } \arccos\left(\frac{OE}{OF}\right) = \angle EOF.$$

In addition, during each backward movement and rotation process, a constraint condition of d*sin θ≤L also needs to be met. For example, when the autonomous robot $A_1B_1C_1D_1$ move backwards and rotates from the state shown in FIG. 6F to the state shown in FIG. 6G, the constraint condition of d*sin θ≤L also needs to be met.

For example, d is 15 cm, x is 2 cm, L is 2 cm, OE is 17 cm, OF is 21.2 cm, α is 45°. Through the equation listed above, it can be determined that the preset angle meets the following constraint conditions:

$$0 < \theta < 45 - \arccos\left(\frac{17}{21.2}\right);$$

$$15 * \sin\theta \le 2;$$

Where, $$\arccos\left(\frac{17}{21.2}\right)$$

is approximately 36.7. Thus, $0<\theta<8.3$, $0<\theta\le7.66$ can be derived from $15*\sin\theta\le2$. $0<\theta\le7.66$ can be derived with the combination of $0<\theta<8.3$ and $\theta\le7.66$, $\theta$ can be selected as 5°, 4°, or 3° in consideration of the margin. Thus, a condition that the autonomous robot $A_1B_1C_1D_1$ does not collide with the obstacles 200 during the rotation process can be reliably ensured, and adjusting the relative distance within the preset edge detection distance range can also be reliably ensured.

In some embodiments, the obstacle has a first wall surface and a second wall surface connected to the first wall surface. The first wall surface and the second wall surface are arranged to form an included angle. The autonomous robot 100 moves along the first wall surface. When the front collision body case 111 collides with the second wall surface for the first time, the autonomous robot 100 starts to perform the edgewise adjustment mode to adjust the relative distance between the edge sensor 14 and the third wall surface within the preset edge detection distance range, and clean a corner area between the first wall and the second wall.

Figure 8A:
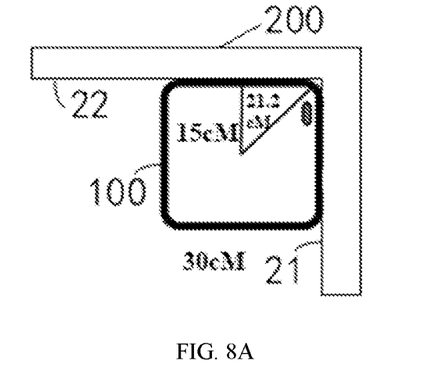
FIG. 8A-8F illustrates a schematic scenario diagram of performing, by the autonomous robot, cleaning operation at a corner of wall provided by one embodiment of the present application.

Referring to FIGS. 8A to 8F together. As shown in FIG. 8A, obstacle 200 is a wall angle set at an included angle. The obstacle 200 has a first wall surface 21 and a second wall surface 22, and the autonomous robot 100 walks along the first wall surface 21. When the front collision body case 111 of the autonomous robot 100 collides with the second wall surface 22 for the first time, the autonomous robot 100 starts to perform edgewise adjustment mode.

Figure 8B:
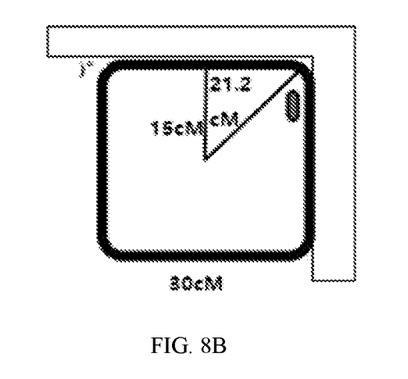
Figure 8C:
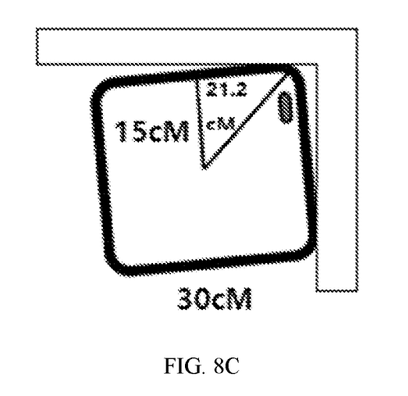
Figure 8D:
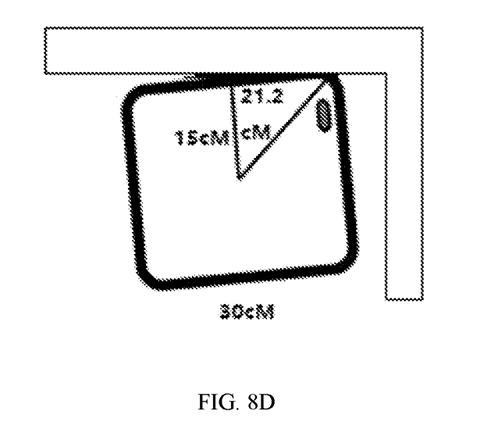
Figure 8E:
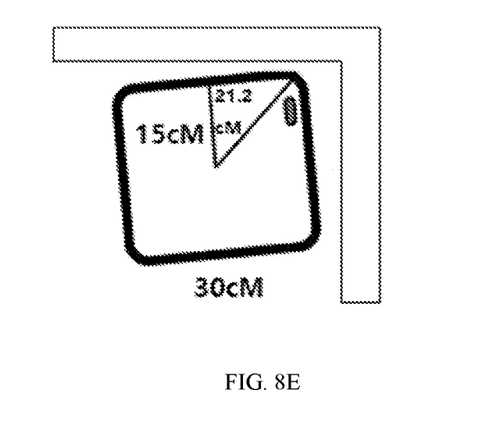
Figure 8F:
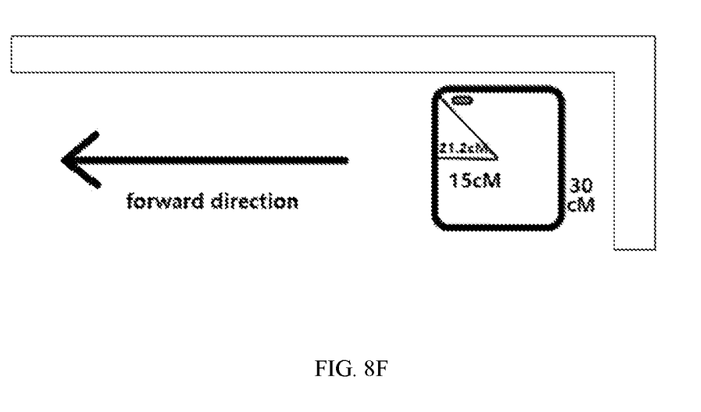

As shown in FIG. 8B, the autonomous robot 100 moves backwards by 2 centimeters. As shown in FIG. 8C, after the backward movement is completed, the autonomous robot 100 rotates by 5° in the left direction. As shown in FIG. 8D, after the rotation is completed, the autonomous robot 100 moves along the edge of the second wall 22. When the autonomous robot 100 moves forwards by a little distance, another collision between the front collision body case 111 and the second wall 22 occurs. As shown in FIG. 8E, the autonomous robot 100 moves backwards by 2 centimeters. The autonomous robot 100 continues to perform the following operations: collision→move backwards→rotation, until the relative distance between the edge sensor 14 and the obstacle is within the preset edge detection distance range. When the edge detection signal is continuously and stably maintained within the preset signal strength threshold range, it indicates that the relative distance between the edge sensor 14 and the obstacle is within the preset edge detection distance range. As shown in FIG. 8F, the autonomous robot 100 terminates the edgewise adjustment mode and performs the edgewise movement mode.

It can be seen from what described above that, the autonomous robot 100 provided in this embodiment can perform cleaning operation on the corner area of the wall self-adaptively, which facilitates improving area coverage of edgewise cleaning.

In conclusion, it should be noted that, the aforesaid embodiments are only used to illustrate the technical solutions of the present application, rather than limiting the technical solutions of the present application. Under the idea of the present application, the technical features in the aforesaid embodiments or different embodiments may also be combined, and the steps can be implemented in any order, many different changes in different aspects of the present application can be made. These changes are not provided in detail for conciseness. Although the present application has been described in detail with reference to the aforesaid embodiments, the person of ordinary skill in the art can understand that the technical solutions recited in the aforesaid various embodiments can also be modified, or some of the technical features in the various embodiments can be equivalently replaced. These modifications or replacements do not make the nature of the corresponding technical solutions to be deviated from the scope of the technical solutions of the embodiments of the present application.

What is claimed is:

1. An autonomous robot, comprising:
a robot body, wherein the robot body comprises a front collision body case, and a peripheral contour of the front collision body case is rectangular;
a movement component mounted on the robot body;
a collision sensor mounted on the robot body and arranged to be adjacent to the front collision body case, and configured to generate a collision detection signal when the front collision body case collides with an obstacle;
an edge sensor mounted on a left side or a right side of the robot body and configured to transmit and receive an edge detection signal at the left side or the right side of the robot body;
a controller mounted on the robot body and electrically connected to the collision sensor and the edge sensor and configured to control the robot body to perform an edgewise adjustment mode; wherein in the edgewise adjustment mode, the controller is configured to gradually adjust a forward direction of the movement component towards a same target according to the collision detection signal feedback by the collision sensor to gradually reduce a relative distance between the edge sensor and the obstacle until the relative distance is within a preset edge detection distance range;
wherein an execution of the edgewise adjustment mode comprises following steps:
in a step A, when the front collision body case collides with the obstacle, the collision sensor is triggered to generate the collision detection signal;
in a step B, the controller controls the movement component to drive the robot body to move backwards in respond to receiving the collision detection signal, the controller controls the movement component to drive the robot body to rotate at a preset angle towards a target deflection direction to finely adjust the relative distance;
in a step C, the controller controls the movement component to drive the robot body to move forward again in an adjusted posture, and accesses the collision sensor at a preset frequency during a forward movement of the robot body so as to detect whether the collision sensor generates another collision detection signal; if the controller detects that the collision sensor generates the another collision detection signal during the forward movement of the robot body, the autonomous robot repeatedly performs fine adjustment of the relative distance in the step B until the relative distance is within the preset edge detection distance range.

2. The autonomous robot according to claim 1, wherein the execution of the edgewise adjustment mode further comprises a step D, at the step D: the robot body continues to move forward, and the controller determines whether an edge detection signal is continuously and stably maintained within a preset strength threshold range; if the edge detection signal is continuously and stably maintained within the preset strength threshold range, the execution of the edgewise adjustment mode is terminated; if the edge detection signal is not continuously and stably maintained within the preset signal strength threshold range, the controller adjusts the forward direction of the movement component according to a direction opposite to the target deflection direction, until the edge detection signal is continuously and stably maintained within the preset signal strength threshold range.

3. The autonomous robot according to claim 1, wherein the preset angle is less than or equal to 20° in the step B.

4. The autonomous robot according to claim 3, wherein the preset angle ranges from 2° to 10° in the step B.

5. The autonomous robot according to claim 1, wherein in the step B, a backward movement distance of the robot body is less than or equal to a difference value between a first distance and a second distance, wherein a minimum distance from a deflection center of the robot body to a front contour edge of the front collision body case is determined as the first distance, and a maximum distance from the deflection center of the robot body to the front contour edge of the front collision body case is determined as the second distance.

6. The autonomous robot according to claim 5, wherein in the step B, the backward movement distance of the robot body is less than or equal to half of the difference value between the first distance and the second distance.

7. The autonomous robot according to claim 1, wherein in the step B, a backward movement distance of the robot body and the preset angle meet a following constraint conditions, which is formulized as:

$$0 < \theta < \alpha - \arccos\left(\frac{OE}{OF}\right);$$
$$OE = x + d;$$
$$d * \sin\theta \le L;$$

wherein, x represents a backward movement distance of the robot body, θ represents the preset angle, d represents a minimum distance from a deflection center of the robot body to a front contour edge of the front collision body case, OE represents a distance from a deflection center of the robot body to the obstacle after the robot body moves backwards, OF represents a maximum distance from a deflection center of the robot body to a front contour edge of the front collision body case, α represents a preset contour parameter of the front collision body case, and L represents the preset edge detection distance range.

8. The autonomous robot according to claim 1, wherein the obstacle is a wall, and when the autonomous robot firstly collides with the obstacle during a forward movement process, the autonomous robot begins to perform the edgewise adjustment mode to adjust the relative distance between the edge sensor and the obstacle to be within the preset edge detection distance range.

9. The autonomous robot according to claim 1, wherein the obstacle has a first wall surface and a second wall surface connected to a first wall surface, the first wall surface and the second wall surface are arranged at an angle, the autonomous robot moves along the first wall surface, and when the front collision body case firstly collides with the second wall surface, the autonomous robot begins to perform the edgewise adjustment mode to adjust the relative distance between the edge sensor and the second wall to be within the preset edge detection distance range, and clean an angle area between a first wall and a second wall.

10. The autonomous robot according to claim 1, wherein the controller is configured to first determine an edgewise movement mode of the autonomous robot, and then select a target deflection direction according to an edgewise movement mode of the autonomous robot.

11. The autonomous robot according to claim 10, wherein, the controller is configured to select a right rotation direction as a target deflection direction if an edgewise movement direction of the autonomous robot is determined by the controller as a left edgewise movement direction, or select a left rotation direction as the target deflection direction if the edgewise movement direction of the autonomous robot is determined by the controller as a right side edgewise movement direction.

\* \* \* \* \*